United States Patent [19]

Day et al.

[11] Patent Number: 5,665,450

[45] Date of Patent: Sep. 9, 1997

[54] OPTICALLY TRANSPARENT COMPOSITE MATERIAL AND PROCESS FOR PREPARING SAME

[75] Inventors: Delbert E. Day; James O. Stoffer; John M. Barr, all of Rolla, Mo.

[73] Assignee: The Curators of the University of Missouri, Columbia, Mo.

[21] Appl. No.: 410,337

[22] Filed: Mar. 24, 1995

Related U.S. Application Data

[63] Continuation-in-part of Ser. No. 934,054, Aug. 21, 1992, abandoned.

[51] Int. Cl.$^6$ ........................................................ B32B 5/12
[52] U.S. Cl. ........................... 428/114; 156/178; 156/179; 428/105; 442/180; 442/391
[58] Field of Search ............................. 428/114, 105, 428/285, 290, 325; 156/179, 178, 182, 245, 286, 312

[56] References Cited

U.S. PATENT DOCUMENTS

| | | | |
|---|---|---|---|
| 2,781,287 | 2/1957 | Gustus et al. | 428/294 |
| 2,828,094 | 3/1958 | Hildebrand | 244/121 |
| 3,425,454 | 2/1969 | Eakins et al. | 138/141 |
| 3,960,635 | 6/1976 | La Roy et al. | 156/286 |
| 4,666,551 | 5/1987 | Soberay et al. | 156/382 |
| 4,985,525 | 1/1991 | Clark et al. | 528/15 |
| 5,032,654 | 7/1991 | Wieners et al. | 526/545 |
| 5,039,566 | 8/1991 | Skubic et al. | 428/113 |
| 5,059,484 | 10/1991 | Clark et al. | 428/412 |
| 5,091,250 | 2/1992 | Chum et al. | 428/339 |
| 5,106,920 | 4/1992 | Murakami et al. | 525/326.1 |
| 5,108,532 | 4/1992 | Thein et al. | 156/285 |

FOREIGN PATENT DOCUMENTS

| | | |
|---|---|---|
| 58-162317 | 3/1982 | Japan. |
| 63-183836 | 7/1988 | Japan. |
| 1248060 | 9/1971 | United Kingdom. |

OTHER PUBLICATIONS

Olson et al., "Fabrication and Mechanical Properties of an Optically Transparent Glass Fiber/Polymer Matrix Composite" J. Comp. Mat'l. 26 (8) (1992) 1181–1192.

Asahi Glass Co., "Improvement of the Transparency of Glassfiber Reinforced Plastics Plate" 8 (1) (1958) 13–21 (abstract only).

Braetsch et al., "Shelyubskii Method of Studying Phase Separation in the System $LI_2O$–$SiO_2$," J. Am. Ceram. Soc. 71 (8) (1988) C–376–C–377.

U.S. Statutory Invention Registration H1162 (published Apr. 6, 1993).

Adhesives Handbook (CRC Press, 1970) 28–30.

Lin et al., "Optical and Mechanical Properties of Optically Transparent Poly(Methyl Methacrylate) Composites," Poly. Eng. & Sci. 32 (5) (1992) 344–350.

Halpin et al., "Ribbon Reinforcement of Composites," J. Comp. Mat'l. 2 (4) (1968) 489–497.

Dunlap et al., "Design of Particulate Composites for Optical Applications," Poly. Comp. 12 (1) (1991) 39–47.

Dunlap, "Glass Flake Reinforced Composites as Optical Materials," App. Optics 30 (13) (1991) 1701–1710.

Milewski et al., "Handbook of Reinforcements for Plastics" (Van Nostrand Reinhold Co. 1987) 76–100.

Otte et al., eds., 2 *Materials Science Research* (Plenum Press 1965) 275–286.

"Modern Plastics Encyclopedia" 54 (10A) (McGraw Hill 1977–1978) 9–10.

Wake, "Adhesion and the Formulation of Adhesives" (Applied Science Publishers 1982) 202.

Six et al., "Optical and Mechanical Properties of Poly(M-ethylmethacrylate) Glass Fiber Composites," Proceedings of the ACS (Fall Meeting, 1991 in New York, NY) 223–224.

Waxler et al., "Optical and Physical Parameters of Plexiglas 55 and Lexan," App. Optics 18 (1) (1979) 101–104.

*Primary Examiner*—Nasser Ahmad
*Attorney, Agent, or Firm*—Leydig, Voit & Mayer, Ltd.

[57] ABSTRACT

Glass ribbon-reinforced transparent polymer composites which provide excellent optical transparency and a low distortion level over a wide temperature range while exhibiting superior mechanical properties as compared to non-reinforced polymer counterparts, and equivalent properties as compared to glass fiber-reinforced counterparts.

27 Claims, 6 Drawing Sheets

OPTICALLY TRANSPARENT COMPOSITE MATERIAL AND PROCESS FOR PREPARING SAME

RELATED APPLICATIONS

This application is a continuation-in-part of U.S. Ser. No. 07/934,054 filed on Aug. 21, 1992 now abandoned.

FIELD OF THE INVENTION

This invention relates, in general, to transparent materials, more particularly to transparent composites reinforced with glass, and to a process for producing such composites.

This invention also relates to a method for increasing the strength of preformed transparent polymeric structures and to the resultant products.

BACKGROUND OF THE INVENTION

Although glass is the most commonly used transparent material used as a glazing material in buildings, vehicles, and the like, glass is not acceptable for all such applications. Glass is heavy and brittle, and may shatter upon impact. Additionally, glass is difficult to form into complex shapes.

For many applications there exists a general need for mechanically strong composite materials that are of high optical quality and have an optical transparency similar or equivalent to that of ordinary window or plate glass. Polymers such as polymethylmethacrylate (PMMA), sold under the trademark Plexiglass®, are often used in place of glass in certain applications in which both impact resistance and optical transparency are required. Unfortunately, polymers such as PMMA still do not have sufficient mechanical strength for many current applications.

Manufacturers of aircraft usually use such transparent polymers for the windows and canopies of aircraft. Because of the poor mechanical strength of such polymers, the polymeric side windows of aircraft are usually restricted to be of a very limited area. Windshields and canopies, which are required to be of greater surface area than side windows, must be made thicker and thus heavier than side windows, to provide sufficient mechanical strength. Still, such windshields and canopies are very vulnerable to impact, such as from a bird strike, which can, and sometimes does, result in breakage of the windshield and corresponding injury to the flight crew.

Thus, a specific need exists in the aircraft industry, as well as in many other industries, for a lightweight transparent material that possesses substantial strength, sufficient to withstand bird impacts. Such material must also be somewhat resilient so that it will flex without shattering when subjected to an impact concentrated in a small area and must be capable of being formed into the complex configurations typical of the canopies of some aircraft. A general need also exists for a method for increasing the mechanical strength and stiffness of PMMA and preformed structures made therewith, and with other such transparent polymers, while still retaining their good optical transparency.

One method of increasing the mechanical strength of polymers like PMMA is to reinforce them with strong cylindrical glass fibers ("glass fibers"). This technology is well known and is widely practiced in the manufacture of fiberglass reinforced plastics (FRP). In most cases, however, the introduction of glass fibers into an optically transparent polymer destroys the transparency of the polymer. All commercial FRP composites presently produced are either optically opaque or translucent such that an object at distances greater than about a few feet cannot be clearly seen through them.

In U.S. Pat. No. 5,039,566, the present inventors disclosed an FRP composite and a method of producing such a composite. The composite of that patent exhibits a high degree of optical transparency, much greater than any FRP commercially manufactured. This high degree of transparency was achieved by carefully matching the refractive index of the glass fibers with that of the polymer. By matching the refractive indices of the two materials across the visible spectrum, the scattering and reflection of light that normally occurs at the glass fiber/polymer interface, which causes the composite to become optically translucent-through opaque, is eliminated and the composite continues to be optically transparent.

One problem which exists in the aforesaid glass fiber/polymer composites is that changes in the temperature of such composites can cause the relative refractive indices of the glass fibers and polymer to change relative to one another such that they become mismatched. This mismatching results in a degradation in composite clarity. For example, when a glass fiber-reinforced PMMA composite is heated from 30° C. to about 70° C., the optical clarity is compromised. This lack of clarity with temperature change constitutes a primary limitation of glass fiber-reinforced transparent composites, i.e., they can only be used if they will be exposed to a narrow range of temperatures.

The foregoing limitations of glass fiber-reinforced composites is of particular significance in aircraft applications, wherein the temperature of the composite can very widely during a single flight, e.g., the composite is warm when leaving a warm, southern locale, becomes colder when reaching the upper atmosphere during flight, and colder still when the aircraft lands in a wintry northern city.

The method of making the product, which is also disclosed in U.S. Pat. No. 5,039,566, does present some difficulties. In accordance with the '566 method the transparent polymer, e.g., PMMA, is formed by polymerizing the appropriate monomer while glass fibers are maintained immersed within the monomer to produce a polymer matrix in which the fibers are embedded. While this process yields composites of improved mechanical properties (higher flexural strength, higher elastic modulus, and higher work of fracture), the polymerization requires a long time (several hours to days) and the resulting optical clarity is inadequate for certain applications.

Accordingly, a need still exists for a lightweight, highly transparent material that possesses substantial strength, which is capable of flexing without shattering when subjected to an impact concentrated in a small area and which is capable of being formed into the complex configurations typical of the canopies of some aircraft. A need further exists for a composite which is capable of being manufactured by a method that is less time-consuming than methods known in the art.

Further, a need exists for a method of increasing the mechanical strength of preformed structures made with PMMA and other transparent polymers. Such a method should employ only a minimum number of fibers, to retain as much as possible the optical clarity of the original structure.

In addition, there exists a need for a transparent material having enhanced mechanical strength whose optical clarity and distortion is relatively less sensitive to changes in temperature as compared with known materials of similar strength, e.g., its clarity remains substantially constant, or exhibits only a slight change, over a relatively broad range of temperatures.

SUMMARY OF THE INVENTION

The present invention provides new optically transparent composites and an improved method of preparing such a composite.

The process aspect of the present invention can produce glass-reinforced, transparent, plastic composites that are essentially as transparent as ordinary window glass, yet have greatly improved mechanical properties. Moreover, the process is rapid, capable of being completed in less than an hour.

Thus, the process of the present invention not only is faster than the process of U.S. Pat. No. 5,039,566, the composite of the present invention also has better optical quality. In addition, the new process makes it possible to strengthen a preexisting structure of a transparent polymer, such as PMMA, by laminating one or more layers of the composite, which may be of various thicknesses, to the surface of a transparent plate. This lamination of a layer of composite to a preformed structure of unreinforced polymer not only mechanically strengthens the polymer with the minimum amount of glass fibers, but also leads to new composites of improved optical quality and transparency.

In accordance with the present invention, it has now been found that it is possible to make transparent composites by hot-pressing glass fibers between layers of a given transparent polymer.

In one embodiment, then, the present invention provides a process for forming a transparent composite structure comprising a polymeric matrix, which comprises a transparent polymer in which are embedded transparent glass fibers having a refractive index that is essentially the same as the refractive index of the polymer itself. The process comprises placing the fibers between layers of a transparent polymer to form a polymer-fiber-polymer sandwich structure, heating the polymer to at least its glass transition temperature or softening point, and applying sufficient pressure to cause the polymeric layers to laminate the glass fibers, thereby forming a transparent composite structure.

In one preferred embodiment, the desired transparent composite structure is made by use of an intermediate pre-preg. The pre-preg is made by (1) coating the desired fibers with a composition, such as a monomeric composition, a composition comprising a polymer dissolved in monomer, or a composition comprising polymer dissolved in solvent, wherein the polymer and the monomer, when polymerized, have refractive indices that are essentially the same as the refractive index of the polymeric matrix, and (2) causing the fibers to contact one side of a sheet of transparent polymer, to form a pre-preg comprised of glass fibers adhered to one side of the polymeric sheet. The fibers may be coated either before or after they are placed in contact with the polymeric sheet. Alternatively, the fibers may be coated with sufficient polymeric solution so that an integral polymeric sheet is formed, thereby obviating the need for an additional polymeric substrate sheet. The fibers in the pre-preg may be oriented so as to maximize the mechanical strength and/or stiffness in any desired direction.

The pre-preg then may be used to make a transparent composite. Layers of pre-preg are stacked together to form a sandwich structure with one or more polymer-fiber/ribbon-polymer repeating units. The polymer is heated to at least its glass transition temperature or softening point and sufficient pressure is applied to cause the polymeric layers to laminate the glass fibers, thereby forming the desired transparent composite structure.

Very importantly, the present invention provides a means to increase the mechanical strength of a preformed transparent polymeric structure. By bonding the transparent composite of the present invention to at least one surface of a preformed transparent polymeric structure, such as a sheet, plate, or the like, a transparent composite structure will result, having dramatically improved physical properties. The thickness of the composite applied to the surface may be very thin or very thick, so that the final product has a wide range of total fiber volume, as a percentage of the total volume of the structure.

The aforementioned method of increasing the physical strength of a preformed transparent structure has the advantage of minimizing any optical interference that may result from the presence of the glass fibers. It was very surprising to find that very significant improvements in physical strength could result from the application of such a small amount of glass fibers to a surface of a preformed transparent composite.

In another aspect, the present invention provides a superior transparent composite which provides both high mechanical strength and a reduced degree of variance in optical clarity and distortion with respect to temperature— the composite retains its optical clarity and low degree of distortion over a relatively wide temperature range, e.g., advantageously over a range of about 35 degrees celsius, and preferably over a range of about fifty degrees celsius. This composite has greater optical clarity and lower distortion level than the glass fiber/polymer matrix composites described previously.

The inventive composite which provides the foregoing properties and advantages comprises a transparent polymer matrix which has at least one glass ribbon (as opposed to glass fibers) embedded therein. More particularly, the polymer composite comprises a transparent polymer matrix having at least one planar surface and at least one glass ribbon having a width and length which define a first planar surface embedded within the matrix, wherein the first planar surface of the ribbon is substantially parallel to the at least one planar surface of the polymer matrix.

It was found that glass ribbons provided a composite which possessed high mechanical strength, e.g., advantageously at least about 10% greater than an unreinforced composite of the same material. Moreover, and surprisingly, this composite possessed a higher degree of optical clarity and lower level of distortion over a given temperature range than the same matrix having glass fibers embedded therein.

This aspect of the present invention is based at least in part upon the recognition that the ribbons provide flat surfaces which can be oriented parallel to the surface of the composite. Because of this, it was further appreciated that with the ribbons' minimum (or absence) of curvature, light entering the composite at a 90° angle is not refracted and, further, that this would be the case regardless of any mismatch in the refractive index between the matrix and the glass ribbon. Thus, even when light is incident upon such a composite at an oblique angle, the flat, parallel sides of the ribbon will induce only a slight displacement of the light.

The foregoing effect is in marked contrast to the random scattering of light which occurs in composites which contain glass fibers therein. This is because circular fibers present a continuously curved surface to incident light, this guaranteeing that most light will strike the fiber at an oblique angle. While this geometry is unimportant when the refractive indices of the fibers and matrix are matched, any mismatch causes refraction which diminishes the optical clarity of the composite.

While it is preferred that this superior glass ribbon/ polymer matrix composite be prepared by any of the methods described herein, it may also be prepared by any suitable known method.

The present invention may be further understood upon reference to the drawings and the detailed description of the preferred embodiments.

DETAILED DESCRIPTION OF THE PREFERRED EMBODIMENTS

It should be appreciated that the primary composite of the present invention can be made with a wide variety of glass fibers, ribbons and polymers, to achieve a wide variety of characteristics. No polymer-fiber pair, or even polymer-ribbon pair, will ever have the same refractive index at all temperatures. As discovered by Christiansen many years ago, when a powder is placed in a liquid of matching refractive index, the cell becomes transparent for a narrow band of wavelengths. (N. K. Sethi, "On Wave Propagation in Optically Heterogeneous Media and the Phenomena Observed in the Christiansen Experiment", Proc. Ind. Assoc. Cult. Sci. 6, p. 121, 1920). The remainder of the light is diffused and appears as a halo around the light source. N. K. Sethi later stated that the transmitted light is capable of producing clear images even though a large portion of the spectrum may be diffused because of a difference in a refractive index. (C. Christiansen, Annalen der Physik, 23, p. 298, 1884). These observations hold true for glass fibers and ribbons in a polymeric matrix. The cylindrical glass fibers and square or rectangular glass ribbons diffuse the light perpendicular to their direction. This is easily observed by shining a laser on the composite. The laser beam is diffused to form a line. When white light is used, the colored halo is observed only on the sides of objects and for light sources that are perpendicular to the fiber direction. The color of the halo depends on the difference in refractive index between the fiber/ribbon and the polymeric matrix at a given wavelength.

For example, the change in refractive index with respect to temperature for PMMA is $-1.1 \times 10^{-4}/°$ C. at 20° C. (Rouy M. Waxler, Dean Horowitz, and Albert Feldman "Optical and Physical Parameters of Plexiglas 55 and Lexan", Applied Optics 18, no. 1, p. 101, 1 Jan. 1979). The change in refractive index for glass is $+1.5 \times 10^{-6}/°$ C. at the same temperature. (Product literature from Schott Glass Technologies Inc., Duryea, Pa.). The difference in refractive index between the glass fiber/ribbon and the PMMA matrix is, therefore, a function of temperature. It follows that the color of the halo is also temperature-dependent. As the temperature is increased, the wavelength of maximum transmission is progressively shorter. For example, at 10° C., 800 nm light is mostly transmitted and blue 400 nm light is mostly diffused. Therefore, a blue halo is observed. At higher temperatures, blue light is mostly transmitted and a yellow and red halo is seen. The composite appears to be most visually transparent at the temperature which corresponds to maximum light transmission in the middle of the visible spectrum (the sodium D line at 589 nm). At this temperature, the halo is blue and red.

Thus, if one desires a transparent composite for a given temperature or temperature range, then one would select a polymer and a glass fiber or ribbon having essentially identical refractive indices at a given, temperature, preferably at a given temperature within the temperature range characteristic of normal use of the composite. Hence, a composite that is to be used to make a window for use in polar conditions may be quite different from one designed for use in tropical conditions. By appropriate selection, then, composites, which are transparent for a given part of the visible light spectrum and which form clear images of distant objects, can be constructed by hot pressing techniques.

TRANSPARENT POLYMERIC COMPONENTS

The composite material of the present invention comprises a polymeric matrix into which are embedded glass fibers or, preferably, glass ribbons. The polymer of the matrix can be a polymer traditionally used for transparent objects, such as polymethyl methacrylate (acrylic), which is the most commonly used polymer. Polycarbonate is also suitable as are practically all transparent polymers. Other suitable polymers that may be used to form the composites of the present invention include the hydrogenated polycyclic norbornene ring-opening polymers made with a 5,8-methano-3a,4,4a,5,8,8a,9,9a-octahydro-1H-benzoindene (MBHI) and 1,4-methano-1,4,4a,4b,5,8,8a,9a-octahydro-9H-fluorene (MOHF) monomer mixture, as described in U.S. Pat. No. 5,106,920, as well as copolymers of a styric monomer and a reactive comonomer having a hydroxyl moiety (or precursor thereto), which may be laminated to polymers, such as PMMA, having pendant ester groups, described in U.S. Pat. No. 5,091,250.

GLASS FIBERS AND RIBBONS

For most applications, the glass fiber or glass ribbon used in a composite of the present invention can be chosen to match the PMMA, or other transparent polymer, as closely as possible in refractive index, at a wavelength of 589.3 nm, at room temperature, or at any other intended operating temperature at which the composite is to be transparent. This allows the middle of the visible spectrum to be transmitted (yellow light). Light not transmitted is diffracted and forms a halo similar to that observed by Christiansen for solid particles, as discussed above. The diffraction halo changes color as the temperature of the composite is varied and the composite becomes matched in refractive index for different parts of the spectrum. The maximum transmission peak shifts to progressively shorter wavelengths as the temperature of the laminate is increased. Although the transmission peak shifts in wavelength, the composite still forms clear images over a broad temperature range. Glass fibers or ribbons produced from BK-10 glass (Schott Glass Works) and sheets of PMMA (3M Corp) are preferred when the transparent polymer is PMMA. Any suitable combination of glass fibers and thermoplastic polymer can be used.

As used herein, a glass fiber ("fiber") is characterized by a circular cross-section. In contrast, a glass ribbon is characterized by a square or rectangular cross-section.

If glass fibers are used, they preferably have a diameter as small as possible, since flaws and discontinuities diminish with size. As a practical matter, it is, difficult to produce glass fibers having a diameter less than about 6 micrometers, so fibers within the range of about 6 to about 50 micrometers are typically used.

The glass ribbons, in contrast, have at least two, and advantageously four, substantially flat planar surfaces or sides. At least two of the surfaces are substantially parallel to each other, and in the case where the ribbon comprises four planar surfaces, the remaining two surfaces are also substantially parallel to each other. In the latter case, the ribbon will have a square, or preferably, a rectangular, cross-section.

Figure 1:
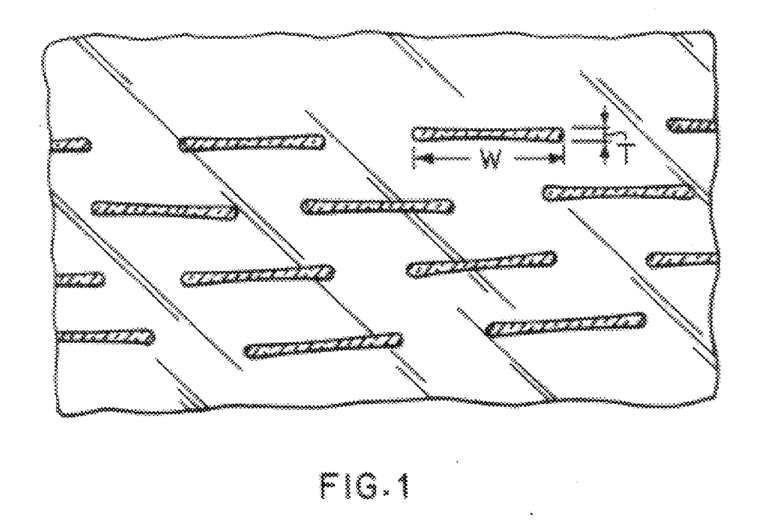
FIG. 1 is a cross-section of a glass ribbon-reinforced composite of the present invention which is comprised of several layers of ribbons embedded with a polymeric matrix, wherein the width (W) and thickness (T) of a representative ribbon is shown therein.

Each planar surface is defined by a width and length, with the length exceeding the width in each case. The thickness of a ribbon is defined as the distance between any two planar surfaces, wherein the width of the surfaces is equal to (in the case of a square cross-section) or greater than (in the preferred rectangular cross-section) the thickness of the ribbon. Generally, then, a ribbon's length will exceed its width, and its width will in turn equal or exceed its thickness. Ribbons having a width from about 50 μm to about 5000 μm and a thickness from about 5 μm to about 100 μm are preferred. Reference can be made to FIG. 1, wherein a preferred embodiment of a composite having layers of ribbons of a rectangular cross-section within a polymer matrix is illustrated. In this figure, the width (W) and thickness (T) of a ribbon are illustrated.

A convenient method of characterizing the ribbons used in the present invention is by reference to a ribbon's aspect ratio. More specifically, the aspect ratio of a ribbon is the width of the ribbon divided by the thickness of the ribbon. For example, a ribbon with a width of 148.0μ and a thickness of 18.5μ would have an aspect ratio of 8. For purposes of preparing the superior composites of the present invention, the aspect ratio may range from about 1 to about 50, and preferably from about 10 to about 50.

To obtain glass fibers, optical glass having an index of refraction corresponding to that of the polymer selected for the matrix is broken into pieces about the size of a typical marble, and these pieces are placed in a bushing or container that is heated, as with a resistance-type heating element. The bushing, which is formed from or at least lined with a material, such as platinum, which is inert to the glass at elevated temperatures, contains numerous orifices, which are somewhat larger than the diameter of the fibers. Typically the orifices may be 300 to 1000 micrometers in diameter. The bushing initially heats the glass to raise its temperature somewhat above the melting temperature, whereupon gas bubbles trapped in the melt rise to the surface and escape. Once the molten glass is bubble-free and chemically homogeneous, the temperature of the bushing is reduced enough to bring the melt to a viscosity suitable for extruding. The molten glass is extruded from the orifices, producing a multitude of fibers from each orifice. The ends of the extruded fibers are collected and are attached in a row to the cylindrical surface of an aluminum drum. The drum rotates about its cylindrical axis and further translates along that axis so that the extruded fibers spiral about the drum, producing a layer or a strip of fibers on the drum. The surface velocity of the rotating drum exceeds the velocity at which the fibers extrude, so that the fibers remain taut between the bushing and drum and further are stretched somewhat in this region, thus acquiring a diameter significantly less than that of the orifices in the bushing. Hence, the speed of rotation to a measure controls the diameter of the fibers. It also has an effect on the index of refraction for some optical glasses. When the fibers reach the desired length, the drum is halted and the fibers are removed from the drum.

The strips of fibers are stored in a vacuum where they remain perfectly dry. The strips may be stacked one upon the ether with plastic sheets interposed between the strips.

With respect to glass ribbons, such are preferably made by a redrawing process (U.S. Pat. No. 3,425,454; Humphrey et al., *Materials Science Research*, Vol. 2 (Otte ed., Plenum Press 1965), pp. 275–86. This process is generally familiar to those skilled in the art. Generally, the redrawing process involves continuously lowering a rectangular glass plate into a furnace along a plane equidistant between two straight and parallel heating elements. The width of the glass plate is oriented parallel to the heating elements. The furnace temperature is adjusted so that the portion of the glass plate in the hot zone is softened sufficiently for drawing into a ribbon, but does not fully melt. Such full melting could result in an undesirable loss of the rectangular shape of the ribbon due to rounding by surface tension. Ideally, attenuation of the softened glass plate to a ribbon filament preserves the proportions of the plate, i.e., a plate with a 10 to 1 width to thickness ratio will ideally produce a ribbon with a 10 to 1 width to thickness ratio, i.e., an aspect ratio of 10.

When preparing a prepreg for use in preparing a composite of the present invention, the glass ribbon is drawn from the softened tip of the glass plate and wound around a rotating wheel, the surface of which is covered by a thin sheet of PMMA or other desired polymeric matrix material. The wheel is translated parallel to its axis of rotation so that the ribbons are evenly distributed in a strip along its surface. The drawing parameters, such as furnace temperature, glass feed rate, and wheel rotation rate, must be adjusted so that a ribbon of the desired size and proportions is produced. Proper system alignment, i.e., when the ribbon is drawn in line with the glass plate and tangent to the take-up wheel, and an appropriate wheel translation rate, result in the ribbons being laid down side by side with their width flat on the wheel. In order to preserve the pristine surface of the glass, an appropriate sizing, bonding or wetting agent, or other type of coating should be applied before the ribbon comes into contact with the rotating wheel/drum.

Once a complete strip of ribbon is wrapped on the wheel, it is sprayed, while still on the rotating wheel, with a solution containing 10 g PMMA/100 ml methyl methacrylate monomer or other material, depending upon the composition of the matrix selected. The spray-borne PMMA combines with the underlying PMMA sheet to encapsulate, i.e., surround, each ribbon in a protective and easy to handle prepreg that can be laminated, i.e., hot-pressed, into a composite. Before fabricating the glass ribbon prepregs into a composite, however, they are aged about 1 day, typically, to evaporate any residual solvent.

FORMATION OF COMPOSITES

A general method for making the composites of the present invention, unless otherwise indicated, is appropriate for the preparation of composites which contain either glass fibers or glass ribbons.

The method begins by placing a desired quantity of glass fiber or ribbon prepregs on top of one or more sheets of PMMA or other transparent polymer. The prepregs can be cut to size and stacked, typically 4–8 layers, in a desired sequence, with the fibers or ribbons being oriented at any angle relative to each other. The stack of prepregs can then be placed between flat, smooth glass plates that will determine the final surface of the composite. Additional layers of PMMA sheet can be interposed between the glass fiber or ribbon prepregs and the surface of the glass plates to prevent the glass fibers or ribbons from penetrating the surface of the composite and touching the glass plate, and also avoiding surface roughness due to nonuniform thermal contraction of the fiber or ribbon and the matrix material near the composite surface.

The composite may be made with or without the use of additional monomer. If desired, a small quantity of methylmethacrylate monomer (MMA) or other monomer may be applied to, as by pouring onto, the fibers or ribbons until the fibers or ribbons are completely wet by monomer, such as MMA, since this usually improves the optical quality of the resulting composite. In most instances it has been found that the best optical properties are achieved when each fiber or ribbon is completely covered or wet by monomer, or solvent such as MMA, so that any air gaps which would lower the optical transparency are completely eliminated.

The monomer is preferably the same monomer as that used to form the transparent polymer, but need not necessarily be so. As long as the monomer is capable of adhering together the layers of transparent polymer and when polymerized, forms a polymer having a refractive index that is essentially the same as the refractive index of the transparent polymer, it should be suitable. Alternatives to the monomers may include adhesive organosiloxane compounds, such as the compositions described in U.S. Pat. Nos. 4,985,525 and 5,059,484. Those adhesives are indicated to be useful in bonding sheets of optically transparent polymers.

As another alternative to the use of monomer, as described above, a polymer solution can be employed, wherein the polymer is dissolved in either monomer or solvent. The use of polymer solutions has been found to be particularly beneficial when the transparent polymer of the composite is polycarbonate. In the manufacture of polycarbonate, a solution of polymer, such as polycarbonate, in solvents such as cyclopentanone or methylene chloride, has been found to be especially useful.

The glass fibers or ribbons can be oriented in any desired fashion; unidirectional, bidirectional, or random orientation. However, improved optical clarity will result if the fibers or ribbons are arranged during manufacture of the composite so that they do not contact one another in the finished composite.

The ribbons may be present from about 0.1 vol. % to about 50 vol. % of the total volume of the composite, and preferably from about 0.1 vol. % to about 20 vol. % of the total volume of the composite.

When the ribbons are laid up, they should be arranged so that at least one of their planar surfaces will be substantially parallel to at least one surface of the resulting composite. This will maximize the optical clarity and low distortion of the resulting composite. In a preferred embodiment, wherein the ribbon is square or rectangular in cross-section, the ribbon should be laid up so that two of the ribbon's planar surfaces are substantially parallel to one, and most preferably both, of the exterior surfaces of the resulting composite.

One or more layers of the transparent polymer (PMMA) sheet are then placed on top of the wet fibers/ribbons so as to form a polymer-(fiber/ribbon)-polymer sandwich comprised of the wet glass fibers/ribbons between layers of polymer, such as PMMA. Additional layers of fibers/ribbons and polymer sheet can be added to form any desired thickness of composite as desired.

The sandwich of fibers/ribbons and transparent polymer (PMMA) layers prepared as described above is hot-pressed at a temperature above the glass transformation temperature of the transparent polymer. The sandwich can be hot-pressed between glass plates or any material with a smooth surface and which will not bond with the transparent polymer sheet during hot-pressing. It is preferred that a low stiffness material, such as paper or cardboard, be placed between the glass plates and the heated platens for uniform loading. The pressing is continued for a period of time which will allow polymer layers to adequately bond. If a monomer or polymer solution is employed, as discussed above, the time should be sufficient for the monomer to fully polymerize and bond to the glass fibers/ribbons and transparent polymer (PMMA) sheets. The time and temperature should also be such that any gas or other bubbles trapped in the sandwich are eliminated during hot-pressing. A temperature of 110° C. and a pressure of 3 MPa for 1–12 hr are preferred conditions for hot-pressing. While deviating from these parameters does not necessarily compromise the quality of the resulting composite, polymer flow must be sufficient to consolidate the prepreg layers but insufficient to cause the fibers/ribbons to lose their alignment.

When the transparent polymer has a relatively high glass transition temperature, as in the case of polycarbonate, it is preferred not to use glass plates for the purpose of hot-pressing, as the polycarbonate may tend to adhere to the glass. As an alternative, metal plates, such as aluminum with a polished chrome surface on one side, are preferred.

The temperature used during the heating step is not critical, but is required to be at or above the glass transition temperature or softening point of the transparent polymer. It is preferable that the temperature not significantly exceed the glass transition temperature or softening point, as excessive temperatures can lead to the vaporization of monomer and the formation of undesirable bubbles. Preferably, the temperature is less than 30° C. above the glass transition temperature or softening point, most preferably less than 20° C. above.

The pressure used for hot-pressing is not critical, but best results have been obtained with PMMA if the pressure is above 1010 psi, such as from about 100 to about 10,000 psi, with about 400 psi being preferred. The hot-pressing temperatures, pressures, and times in Table I have been used for PMMA with success. It has been found to be beneficial to first apply an initial slight pressure, such as less than 50 psi, and preferably less than 10 psi, to the sandwich structure to allow the monomer to thicken, prior to the application of a higher pressure. This approach reduces the formation of bubbles or other defects in the structure. Vacuum may also be applied during the heating step, to assist in the removal of entrapped air or bubbles of vaporized monomer.

Composites made by the use of pre-pregs can be formed under similar conditions. It has also been found beneficial to spray or otherwise apply additional monomer and/or dissolved polymer between the pre-preg layers prior to hot-pressing.

If the prepregs are not precut and stacked, the composite, itself, can be cut to a desired size and surface-polished. The composite also can be shaped simply by heating the composite enough to render it plastic and then deforming it over a suitable mold.

TABLE 1

HOT PRESSING CONDITIONS USED TO
PREPARE PMMA/GLASS FIBER COMPOSITES

| Sample | Vol. % Fiber | Hot Pressing | | |
|---|---|---|---|---|
| | | Time (hrs) | Temp (°C.) | Pressure (MPa) |
| 28 | unk | 24 | 130 | 2.76 |
| 31 | unk | 12 | 110 | 3.45 |
| 41 | 4.3 | 18 | 100 | 1.73 |
| 55 | unk | 12 | 100 | 6.89 |
| 63 | unk | 12 | 90 | 0.34 |
| 75 | 8.4 | 12 | 90 | 2.76 |

Laminates pressed at temperatures below 100° C. for 12 hours or longer resulted in fully cured, bubble free composites with the best optical clarity.

PRE-PREG FORMATION

In accordance with a preferred embodiment, pre-pregs containing PMMA, or other transparent polymer, and glass fiber or ribbon of matching refractive index are used to make composites.

A layer of the transparent polymer (PMMA) sheet may be placed on the fiber/ribbon take-up wheel, i.e., the wheel or drum upon which the fibers/ribbons are wound as they are pulled from the molten glass. During fiber/ribbon pulling, each fiber/ribbon preferably is coated with a coupling agent, as discussed below, and is also coated with monomer, such as MMA, and/or with a polymer solution in which the polymer is dissolved in monomer or in a solvent, so as to completely coat each fiber/ribbon. The wet monomer (MMA) on the fiber/ribbon softens the polymer sheet and causes the fiber/ribbon to adhere to the polymer sheet. Several layers of fibers/ribbons can be wound on the polymer sheet. Most preferably a fine mist of monomer is sprayed on the fibers/ribbons as they are wound on the polymer sheet. Heat can be applied to the take-up wheel to dry the fibers/ribbons as required. After the desired amount of coated fiber/ribbon has been wound on the polymer sheet, the polymer sheet with the attached fiber/ribbon, hereafter called a pre-preg, is cut along its width and removed from the take-up drum. The pre-preg sheet is then cut to the desired size. These pre-preg layers are stacked with the fibers oriented in the desired way (unidirectional, cross-ply, etc.,) and then hot-pressed at conditions such as those listed in Table 1.

As an alternative to the foregoing, the fibers/ribbons may be coated with sufficient polymer solution so that an integral polymer sheet is formed, without the need for an additional polymeric substrate sheet.

In a prepreg, the ribbons may advantageously be included in an amount which ranges from about 5 vol. % to about 90 vol. % of the prepreg.

COUPLING AGENTS

The glass fibers/ribbons used in the pre-pregs may be coated with a coupling agent during pulling both to protect the fiber/ribbon and to provide a means for the fiber/ribbon to bond to the matrix. In the presence of such an agent, the fibers/ribbons and polymeric matrix may bond together, helping to eliminate encapsulated air. One substance suitable for use as a bonding or coupling agent is methacryloxypropyl-trimethoxy-silane. This substance, which is often referred to simply as silane, possesses the following molecular formula:

$CH_2$=$C(CH_3)COOCH_2CH_2CH_2Si(OCH_3)_3$

This silane, which possesses a molecular weight of 248.3 and a density of 1.045, is available from Petrarch Systems, Inc.

Other silanes are also suitable. A silane coupling agent may be described as a molecule that possesses two classes of functionality—a readily hydrolyzable group and nonhydrolyzable organic radical. Both functionalities are bound to the same silicon atom. The hydrolyzate product, silanol, subsequently reacts with a siliceous inorganic substrate. The silanols can also react with metal oxides of aluminum, zirconium, tin, iron, and boron. The nonhydrolyzable organic radical possesses a specific organic functionality capable of interacting with polymers. The general formula is given below:

$(X)_{4-n}$—$SiR_n$, where "X" is the hydrolyzable group; chlorine, alkoxy or acyloxy and "R" is the organic radical.

At this time, it is unknown whether the glass fibers or ribbons actually bond to the matrix in the hot-pressed laminates of the present invention. Scanning electron micrographs of fracture surfaces of the laminates seem to indicate some adhesion of the PMMA to the fiber/ribbon. However, this is small in comparison to what is observed in composites prepared using the fiber/ribbon suspended in monomer technique of the prior patent. This is quite probably due to most of the monomer, which was added to the assembly, being forced out during pressing. Although a strong bond between the fiber/ribbon and the matrix should give the highest overall strength, a weaker bond allows some fiber/ribbon pull out, and should improve the fracture toughness of the material. Even if bonding is not achieved, the coupling agent still serves to protect the fiber/ribbon from physical abrasion (microcracks on the fiber/ribbon surface), which would lower the composite strength.

CHARACTERISTICS OF THE LAMINATES

The laminates exhibit tensile strengths significantly higher than commercially available unreinforced PMMA, although strong adhesion of the fiber/ribbon to the matrix may not be evident.

The individual fibers/ribbons should extend across the composite, preferably without interruption. The continuous fibers/ribbons generally lie parallel to each other, and preferably do not contact one another. The fibers/ribbons may occupy from about 0.1 to about 50% of the full volume of the composite and should preferably occupy from about 1 to about 25% of the full volume.

The strength of the composite may be tailored by constructing it as a laminate consisting of individual plies or laminae. The orientation of the fibers/ribbons may wary between plies from 0° to 90°.

While continuous and parallel fibers/ribbons produce superb structural characteristics, the laminate may be constructed with discontinuous and randomly oriented fibers/ribbons. Such fibers/ribbons may be uniformly distributed in the matrix.

REINFORCEMENT OF PRECAST TRANSPARENT STRUCTURES

When the composites of the present invention are laminated onto preformed transparent substrates, such as glass, polycarbonate, PMMA, or the like, dramatic improvements in mechanical properties may be achieved. This dramatic improvement may be achieved through the use of very little glass fiber/ribbon. Thus, such structural advantages may be achieved by using less than about 20 percent, by volume, of glass fibers/ribbons in the final structure, an usually less than about 10 percent, although, in some instances, the fiber/ribbon volume is preferably less than about 5 percent, and most preferably less than 1 percent.

The development of a transparent composite requires that the strength benefit be obtained with as little reinforcement as possible because a larger number of fibers/ribbons in the composite may result in poorer optical properties. Thus, it has been found that it is possible to maximize the strength contribution of the fibers/ribbons by placing the fibers/ribbons on or near the surface of the composite. Since the glass fibers/ribbons are stronger than the transparent polymer, such as PMMA, in both tension and compression, they can be placed either on the top, the bottom surface, or on both, for improved composite strength. The advantage of such a placement of the fibers/ribbons can be demonstrated through three point flexural bending measurements that cause the bottom surface of the sample to be in tension and the top surface to be in compression. Such tests demonstrate that there is a neutral plane oriented through the center of the specimen which is not stressed. Reinforcement placed here will not contribute to the overall strength of the composite.

Thus, by hot-pressing the composites of the present invention to preformed transparent structures, which may be polymeric structures, such as that made from PMMA or polycarbonate, or even glass, it is possible to place the glass fiber/ribbon at the surface of the structure, where stresses occur during bending. Even application of a thin laminate to a precast sheet of transparent polymer, such as PMMA, increases the bend strength substantially.

ADVANTAGES OF THE METHOD OF THE PRESENT INVENTION

Certain advantages of the hot-pressing technique for preparing transparent composites are as follows.

1. Hot-pressing is a faster method of preparing the composite. For example, a hot-pressed sample 4 by 6 inches can be made in less than one hour, while preparing an equivalent composite by conventional polymerization of the monomer requires at least 24 hours and usually up to 72 or 96 hours.

2. Orientation of the fibers/ribbons is easier to control in hot-pressed samples than for composites made by conventional polymerization. The pre-preg layers can be easily stacked with the fibers/ribbons arranged in any number of ways. In samples made by conventional polymerization, the fibers/ribbons must be supported in some fashion in the liquid and fluid MMA until polymerization occurs. It is easy to orient the fibers/ribbons in the vertical direction because of their natural "hanging tendency," but it is extremely difficult to orient and support the fibers/ribbons in the horizontal direction.

3. The optical transparency and quality of the composites is improved by hot-pressing. Hot-pressed composites have a high transparency throughout the visible spectrum. Optimum results are achieved when each fiber/ribbon is coated with a thin layer of polymer. One means to achieve such a thin coating is to spray the glass fibers/ribbons as they are wound on the polymer (PMMA) sheet on the take-up drum during fiber/ribbon pulling. Such coating is considered especially important to the improved quality of hot-pressed composites since this apparently minimizes air gaps around the fiber/ribbon and uncovered region on the fiber/ribbon which tend to scatter and reflect light (due to mismatch in refractive index.)

Hot-pressed composites show less distortion of distant objects.

4. The hot-pressing technique makes it possible to laminate thin layers of the composite to the surface of polymer (IPMMA) plates which, thereby, takes maximum advantage of the high strength glass fibers/ribbons. When a plate is loaded in flexure, like a beam supported at its ends, the maximum stresses are at the bottom and top surface of the plate. Thus, laminating the composite to the surface offers the maximum strengthening with the minimum amount of fiber/ribbon. Lamination during hot-pressing, therefore, permits a composite of given strength to be made with the minimum amount of fiber/ribbon which leads to improved optical transparency. Flexural strength data for samples made by laminating a thin layer of composite to a plate of ordinary PMMA sheet (0.25 inches thick) is given in the following Table 2.

TABLE 2

FLEXURAL STRENGTH (3pt BEND) OF COMMERCIAL ¼" THICK PMMA WITH AND WITHOUT GLASS FIBER LAMINATED TO THE SURFACE

| Orientation | Fiber Volume | Strength (psi.) | % Increase* |
| --- | --- | --- | --- |
| Commercial PMMA | 0% | 17,300 | — |
| Film Laminate (Top Side) | 0% | 16,300 | −5.8 |
| Film Laminate (Bottom Side) | 0% | 15,400 | −11.0 |
| Fiber Laminate (Top Side) | 0.9% | 21,600 | 24.9 |
| Fiber Laminate (Bottom Side) | 0.9% | 20,600 | 19.1 |
| Fiber Laminate (Both Sides) | 1.4% | 24,600 | 42.2 |

*% increase is in comparison to commercial PMMA

All laminates were hot-pressed at 90° C. and 400 psi. for 12 hours and contain 4 sheets of 0.003 in. (total thickness of 0.0012 in.) thick PMMA film manufactured by 3M. The laminates containing fiber (4 layers) were 0.0015 in. thick. The ¼" PMMA plate was manufactured by Cyro Industries.

As shown by the example at the bottom of Table 2, laminating a layer of composite only 0.015 inches thick on the top and bottom surface of the 0.25 inch thick plate increased the flexural strength by 42% and the total fiber content was only 1.4 vol %. This laminated composite had an optical transparency of >80% over the visible range.

The ability to simultaneously hot-press the composite and laminate it to bulk polymer, such as PMMA, is a major advantage in producing a transparent composite of the highest mechanical strength with the minimum amount of glass fiber/ribbon.

Figure 4A:
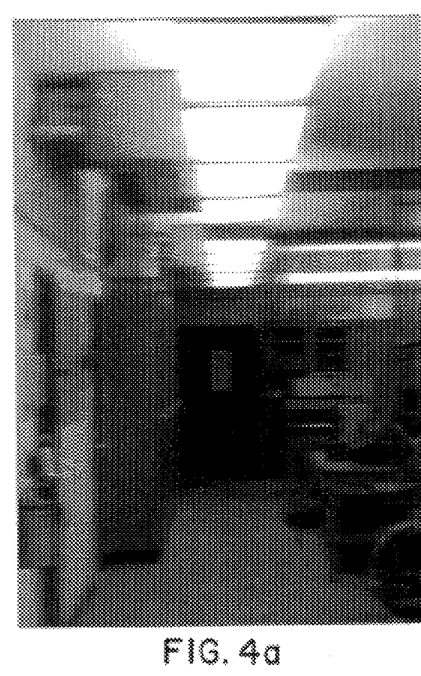
FIG. 4a is a photograph of the laboratory scene of FIG. 2 taken through a glass ribbon-reinforced PMMA composite of about 1 mm in thickness, wherein the composite is at about 22° C. and the camera is in the same position as in FIG. 2.
Figure 4B:
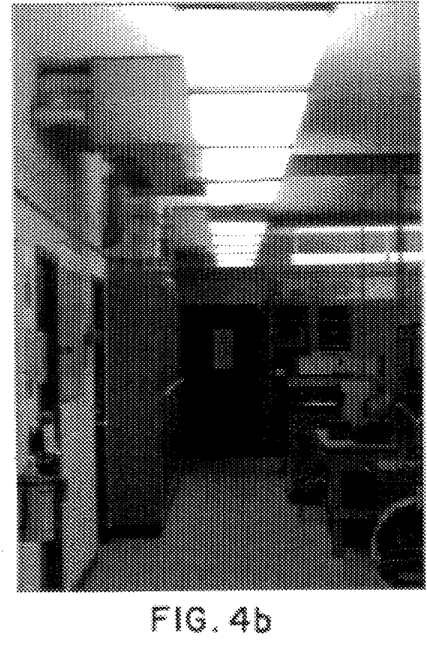
FIG. 4b is a photograph of the laboratory scene of FIG. 2 taken through the glass ribbon-reinforced PMMA composite of FIG. 4a, wherein the camera is in the same position as in FIG. 2, but the composite is at a temperature of about 70° C.

5. Hot-pressed composites have not only a higher mechanical strength than ordinary PMMA, but they also retain their strength to a higher temperature as shown by the curves in FIG. 4. The dashed line shows the strength of the PMMA sheet by itself. At 100° C., its tensile strength is essentially zero. The hot-pressed composite which contains 10.4 vol % glass fiber (solid squares) is not only more than twice as strong as room temperature, but still has appreciable tensile strength at 100° C.

6. The transparent composites have potential use in any application where a strong and optically clear material is used. Such uses would include windows and canopies on high speed military and civilian aircraft, sky lights in buildings, transparent "armor" on vehicles or in buildings, and perhaps as a replacement for laminated glass in buildings and vehicles. The thin hot-pressed composite layer is a potential replacement for the plastic layer now used in laminated glass since the PMMA composite adheres well to glass and should be stronger than the present plastic (PVB) used in laminated glass.

7. As indicated, the optical transmission of the hot-pressed composites varies with temperature since the match or mismatch in refractive index of the polymer and glass fiber vary with temperature because the refractive index of polymers and glass have different temperature dependence. Thus, if the refractive index of the two materials are exactly equal at some temperature, any change in temperature will cause an increasing mismatch in the refractive index and this will reduce the optical transmission. In some cases, this temperature dependent transmission may be an advantage, rather than a disadvantage. This material will be self-darkening and requires no power for operation.

From the foregoing, it is clear that the present invention provides a technique for making mechanically strong composites that have a very high degree of optical transparency and clarity. While the present invention has concentrated on reinforcing PMMA, it emphasized that the concept of hot-pressing pre-pregs onto a thermoplastic polymer, wherein the pre-preg contains glass fibers/ribbons, whose refractive index matches that of the polymer, applies to any polymer-glass system.

All patents referred to hereinabove are incorporated herein by references, in their entirety.

The present invention will be further described in terms of the following nonlimiting examples.

EXAMPLES 1-5

The formation of the glass fiber/poly (methylmethacrylate) composites consisted of fiber pulling, fiber coating and drying, the formation of a pre-preg, assembly, and pressing, all in accordance with the procedures discussed above.

A bulk optical glass (BK 10) available from Schott Glass Technologies Inc. was drawn into fibers from a platinum bushing. BK 10 was selected so that the refractive index of the glass fiber would match that of the PMMA polymer. When the bulk glass is drawn into fibers, the refractive index is lowered due to the lower density of the rapidly cooled fibers. A small diameter fiber pulled from the melt cools more rapidly than larger diameter fibers and has a lower refractive index. (James R. Olsen, "Fabrication and Mechanical Property Analysis of a Transparent Glass Fiber Reinforced Polymer Matrix Composite", Thesis (M.S.), Univ. of MO at Rolla, 1988). The laminates contained fibers which were 15 microns in diameter. The fibers were coated during pulling using a grooved polyethylene coating wheel suspended in a water cooled-bath of coating solution. The wheel was grooved to insure the coating of individual fibers. The fibers were coated with a solution of 3-methacryloxypropytrimethoxysilane. This coupling agent was dissolved in a 90:10 methanol/water mixture which had been adjusted to a pH of 3 to 5 with acetic acid to minimized oligomer formation. (Edwin P. Plueddemann, "Silane Coupling Agents", Plenum Press, 1982).

The-glass was broken into small marble-size pieces and placed in the bushing where it is heated to 1350° C. At this temperature the glass exists in a molten state and gas bubbles escape from it. Then the molten glass was allowed to cool to an extrusion temperature between 1150° C. and 1260° C. and within this range it likewise remains molten. The molten glass was extruded from the orifices in the bushing and collected as a strip on the drum which both rotates and translates so that the strip spirals about the surface of the drum, the angular velocity of the drum being such that the extruded fibers attenuate somewhat and acquire a diameter ranging between 10 and 50 micrometers.

The-coupling agent concentration was 1.%. The coated fibers were pulled through a tube (clam shell type) furnace to evaporate the solvent. If the fibers are allowed to come into contact with each other while still wet they will bond together resulting in poor wetting of the fibers by the matrix-during pressing. The fibers were collected on 0.003 in. thick PMMA sheet obtained from the 3M Corporation. A mist of methylmethacrylate monomer was sprayed on the film which partially dissolves the film and adheres the fibers to it for ease of handling. This formed a pre-preg tape. Although the coated glass fibers were adhered to the surface of the polymer-sheet they were still susceptible to moisture and had to be stored in a desiccator.

A steel mold with Teflon-lined sides and polished chrome pressing surfaces was used for the assembly step of the process. This contained the fibers and prevented them from bowing during pressing even when thick laminates are constructed. The laminate was assembled by adding MMA with 0.2% free radical initiator between each pre-preg. This caused the fibers to be dissolved from the film surface so that they were surrounded by monomer during pressing. A vacuum was applied to the mold for approximately 15 minutes to remove the air bubbles from the assembly. Slight pressure was applied to the mold at 90° C. for approximately 15 minutes to allow the monomer to thicken which minimizes the amount forced out during pressing. The pressure was then increased to 400 psi. for 12 hours. The composite was then cooled and removed.

Five composites were prepared by use of the aforementioned procedure, wherein each composite had four layers of glass fiber. Such laminates were then hot-pressed against ¼" cast PMMA and compared to laminates made in a similar manner, but without the presence of glass fiber.

All laminates were hot pressed at 90° C. and 400 psi. for 12 hours. The comparative laminates contained 4 sheets of 0.003 in. (total thickness of 0.012 in.) thick PMMA film manufactured by 3M. The laminates of the present invention, as indicated, contained 4 layers of fiber and were 0.0015 in. thick. The ¼" PMMA plate was manufactured by Cyro Industries.

Flexural strengths (3 pt bend) of laminates against ¼" cask PMMA were measured using a 5 mm/min. crosshead speed on an 8 cm wide jig. The strength of these composites was compared to commercial PMMA and to laminates made by the above procedure but without glass fiber.

made on a Simplimet press manufactured by Buehler Ltd. Layers of glass fiber coated with methacryloxypropyltrimethoxy-silane were used with three

TABLE 3

FLEXURAL TESTING OF GLASS FIBER LAMINATES PRESSED AGAINST ¼" CAST PMMA

| | | | | % INCREASE OVER | |
|---|---|---|---|---|---|
| SAMPLE # | ORIENTATION | STRENGTH (psi) | STANDARD DEVIATION | COMM PMMA | NO FIBER LAM |
| 1 | (——)$_4$ ¼" | 16800 | ±500 | −3 | |
| 1 | ¼" (——)$_4$ | 15400 | ±800 | −11 | |
| 2 | (——)$_4$ ¼" | 15800 | ±200 | −9 | |
| 2 | ¼" (——)$_4$ | 15300 | ±300 | −12 | |
| 3 | (0000)$_4$ ¼" | 23200 | ±500 | 34 | 38 |
| 3 | ¼" (0000)$_4$ | 21800 | ±2500 | 26 | 42 |
| 4 | (0000)$_4$ ¼" | 20000 | ±2000 | 16 | 19 |
| 4 | ¼" (0000)$_4$ | 19400 | ±1300 | 12 | 26 |
| Average strength increase over commercial PMMA for 4-ply glass fiber laminate on ¼" cast PMMA | | | | 22 | |
| 5 | (0000)$_4$ ¼" (0000)$_4$ | 24600 | 2000 | 42 | |

The sample numbers in the foregoing table indicate which test bars were cut from the same composite. Three bars were tested for each orientation. As the PMMA film contained a stabilizer, the film had slightly different properties than the cast material. This difference caused the laminates without-fiber to exhibit an overall strength lower than commercial cast PMMA. The commercial cast PMMA has a three point bend strength of 17300 psi ±300.

Although the fiber content, and therefore the strength, may vary somewhat between composites, the average strength increase over commercial PMMA for the 8 layer composite laminated on both sides was twice that of the 4 layer composites laminated on one side, the average being about 5% per fiber layer. The average fiber volume was 0.9% for composites 3 and 4 and 1.4% for composite 5. The thickness of the surface laminates containing fiber were approximately 0.015 inch.

EXAMPLE 6

A 2-ply composite laminate was made in accordance with the general procedure of Examples 1–5, and the tensile strength was measured. The laminate contained 4% fiber by volume as determined by gravimetric methods. Six pieces of this laminate were tested using ASTM method D882 with an average tensile strength of 15600 psi. ±3300. This represents a 70% increase over commercial PMMA (tensile strength= 7000–11,000 psi.) for this fiber diameter and volume percent. (R. C. Weast, "Handbook of Chemistry and Physics", 60th ed., CRC Press, 1979).

EXAMPLES 7 AND 8

A PMMA sheet (0.0.03 in. thick) manufactured by 3M was used in hot-pressing experiments. The samples were PMMA sheets between each layer. The sample, Example 7, was pressed at 10,000 psi and heated. A similar sample, Example 8, was made in which the fiber was wet with MMA prior to pressing. This sample was later heated between glass plates (130° C.) to improve the surface. The sample of Example 8, which was wet before pressing, exhibited much better optics.

EXAMPLES 9–12

The samples were produced on a Carver Lab Press model W with heated platens. The platens were heated to 130° C. A strip of glass fibers coated with methacryloxypropyl-trimethoxy-silane was placed between two sheets of PMMA, wet with MMA monomer, and pressed between glass plates. This sample, Example 9, was pressed at approximately 400 psi, however, it would not sustain the load until the fibers were forced through the polymer to the glass plates. This sample of Example 9 was cut in half was placed between additional PMMA sheets (total of 10) and repressed, Example 10. The surface of Example 10 improved only slightly. Many bubbles were found to be present along the length of the fiber so another sample, Example 11, was made in which the sample was degassed in a vacuum. This sample was somewhat better, however upon examination with a microscope bubbles could still be seen, probably due to MMA boiling at the 130° C. press temperature. Half of this sample of Example 11 was also pressed between additional PMMA sheets, Example 12. As before, the surface improved only slightly. A sample of Example 12 when viewed in immersion oil to negate surface effects, showed almost no distortion; however, the blue fringe which is characteristic of $RI_{polymer} > RI_{glass}$ was present.

EXAMPLES 13 AND 14

Composites were made by hot-pressing two layers of a fiber glass pre-preg, made generally in accordance with the procedure of Examples 1–5, between a top and bottom layer of a PMMA film. The composite consisted of a top and bottom sheet of PMMA (made by 3M), with two layers of the fiber glass pre-preg sandwiched between the PMMA sheets. One sample was made by hot pressing the four layers without adding extra MMA, Example 13. A second sample, Example 14, was hot pressed in an identical fashion, but additional MMA (liquid.) was poured between each of the four layers before hot pressing. The purpose of adding this extra MMA was to fill any holes or voids that may be present in the pre-preg layers or sample and to wet any of the glass fibers that may not have been completely covered with PMMA. Either of these conditions would detract from the optical properties by reducing the optical clarity and transparency. Both samples were hot pressed under the same conditions, namely, 280° F. for 3 h at 100 psi. The two composites contained 5 vol % glass fibers.

The visual appearance of the two samples was quite different and noticeable. The sample of Example 13 made with the added MMA was highly transparent and no glass fibers were visible in the composite. In the sample of Example 14 made without added MMA, large numbers of unwet glass fibers were visible as white lines, streaks or areas in the sample. These white lines or streaks reduced the optical transparency.

EXAMPLE 15

Using the general procedure of Examples 1–5, fibers made from BK10 (Schott Glass Technologies) were pulled onto a drum that had a piece of polycarbonate film wrapped around it. After the polycarbonate film was covered with the desired quantity of fibers, the fibers were sprayed with MMA, to bond the fibers to the polycarbonate film. The pre-preg sheets were then removed from the drum and laminated to form composites that contained approximately 1.5 percent glass fibers, by volume.

EXAMPLE 16

Using the general procedure of Examples 15, fibers made from SK 7 (Schott Glass Technologies) were used to make polycarbonate composites The SK 7 glass was used because it has a refractive index of 1.60729, which should yield fibers with a refractive index closer to that of polycarbonate, 1,586. After the glass fiber was pulled to a fiber diameter of 10 microns, its refractive index dropped to 1.597, much closer to that of polycarbonate.

EXAMPLES 17–19

The general procedure of Examples 16 was used to make pre-pregs from fibers made from SK 7 (Schott Glass Technologies). After the polycarbonate film was covered with the desired quantity of fibers, the fibers were sprayed with a 5 wt. % solution of polycarbonate in cyclopentanone (Example 17), a 2.5 wt. % solution of polycarbonate in cyclopentanone (Example 18), and a 5 wt. % solution of polycarbonate in methylene chloride (Example 19). The pre-pregs made with the different coating solutions were then made into composites.

To improve the wetting of the fibers, the entire system, including the mold, was placed in a vacuum to remove as many air bubbles as possible during the hot-pressing procedure. Pressures from 95 to 380 psi and times from 10 to 30 minutes were used. The composite with the best optical properties was prepared from the pre-preg made using a spray of 2.5 wt. % polycarbonate in cyclopentanone, pressed at 250° C. at 95 psi for 15 minutes.

EXAMPLE 20

A composite was made using a core of 0.25 inch polycarbonate sheet (PC CORE), with one sheet of polycarbonate film (PC FILM, approximately 0.375 mm thick) on each side and two-layers of pre-preg (PRE-PREG) on top of each, fiber side down. Each pre-preg contained approximately 1 percent, by volume of BK 10 fiber. The sandwich, then was comprised of layers stacked as follows:

PC FILM
PRE-PREG (fiber side up)
PRE-PREG (fiber side up)
PC CORE
PC FILM
PRE-PREG (fiber side up)
PRE-PREG (fiber side up)

The modulus of rupture was determined from 3-point bending for (1) standard 0.25 in. cast polycarbonate cores, (2) standard 0.25 in. cast polycarbonate cores, having three 15 mil polycarbonate sheets laminated to each side, and (3) the composite/core laminates having the foregoing structure.

It was determined that the average modulus of rupture for the polycarbonate cores was 16,200 psi, whereas the cores with the laminated polycarbonate films on each side had a lower average value of 15,100 psi. By contrast, the polycarbonate core laminates had an increased average modulus of rupture of 16,600 psi, a 10 percent increase (16,600 vs. 15,100) with only a 1 volume percent fiber leading.

EXAMPLE 21

This example describes the use of a glass ribbon as the reinforcement in a PMMA composite and illustrates the superior optical clarity and lower distortion level as compared to a glass fiber-reinforced PMMA composite over the same temperature range. Moreover, this example demonstrates the ability of glass ribbon-reinforced composites to retain their optical clarity and low distortion over a relatively broad variances in temperature. This example further demonstrates that the flexural strength of the composite is substantially the same when using glass fibers or glass ribbons.

A. Distortion and Optical Clarity

1. Qualitative Results

A fiber-reinforced and a ribbon-reinforced composite were prepared in the manner of the present invention. The glass content in each composite was comparable to that of the other (fiber 5.8 vol. %, thickness about 1.3 mm; ribbon 6.5 vol %, thickness about 1.33 mm).

Figure 2:
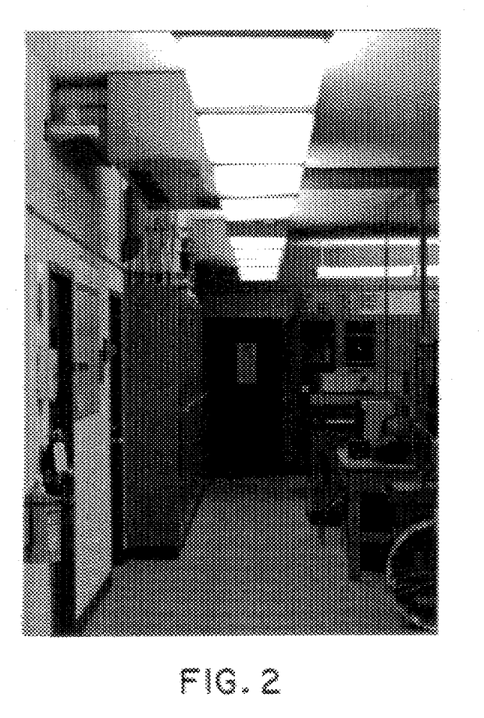
FIG. 2 is a photograph of a laboratory scene taken through an ordinary camera showing an eye chart about 60 feet from the camera.
Figure 3A:
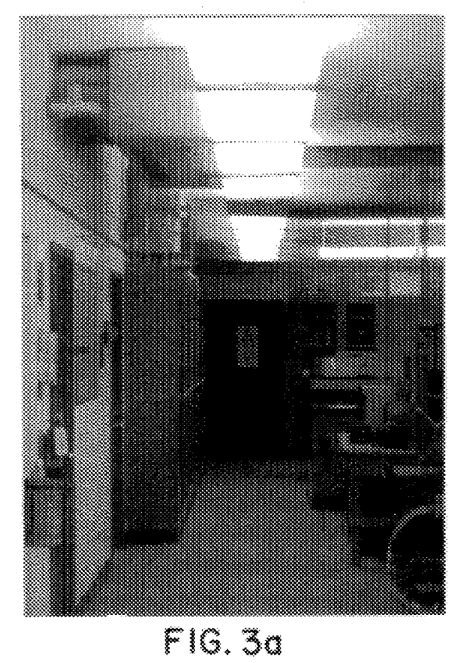
FIG. 3a is a photograph of the laboratory scene of FIG. 2 taken through a glass fiber-reinforced PMMA composite of about 1 mm in thickness, wherein the composite is at about 30° C. and the camera is in the same position as in FIG. 2.
Figure 3B:
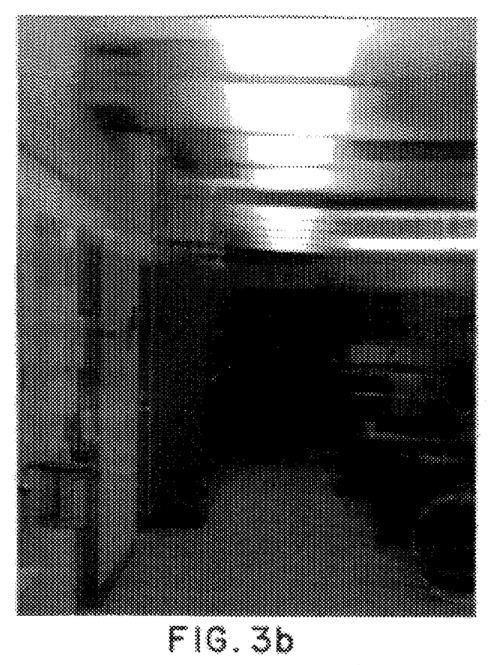
FIG. 3b is a photograph of the laboratory scene of FIG. 2 taken through the glass fiber-reinforced PMMA composite of FIG. 31a, wherein the camera is in the same position as in FIG. 2, but the composite is at a temperature of about 70° C.

In order to demonstrate the distortion caused by these composites at various temperatures, a series of photographs was taken. The first of these, FIG. 2, is of a laboratory scene where neither composite is in front of the camera lens. FIG. 3a is a photograph of the same scene with the fiber composite, which is at a temperature of 30° C., being in front of the lens. The composite at that temperature exhibits high optical clarity and low distortion. FIG. 3b is a photograph of the same scene with the fiber composite, which is at a temperature of 70° C., being in front of the lens. At this temperature, the scene is badly distorted, and significant optical clarity in the composite is lost.

FIG. 4a is a photograph of the same scene through the ribbon composite at room temperature (about 22° C.). Optical clarity is good, and it is substantially free of distortion. FIG. 4b is a photograph of the same scene with same ribbon composite, which is at a temperature of 70° C., being in front of the lens. The composite retains excellent optical clarity and remains substantially distortion-free, despite its high temperature.

Providing a quantitative test for distortion with respect to a composite is difficult. Therefore, for purposes of the present invention, a comparative test was used which, it is believed, is as accurate and succinct as the circumstances allow. More particularly, composite will be deemed to be substantially-free of distortion, i.e., its distortion is substantially constant, when an observer is able to discern substantially the same degree of detail in a given scene (e.g., letters on an eye chart a certain distance from the observer) when viewing the scene through the composite when the composite is at one temperature as one would discern when viewing that scene through the composite when the composite is at a different temperature.

2. Quantitative Results

In order to be provided with an indication of the optical clarity of the composites, their optical transmission was measured on an HP8452A Diode Array spectrophotometer. Of course, any suitable instrument may be used to determine the optical transmission of a given composite. Because of the characteristics of this instrument, the optical transmission of multiple composites was measured in order to obtain appreciable transmission losses with temperature. The measurements were taken through six (approx. 1 mm thick) composites of four layers each. The transmission values measured for these samples were normalized to the transmission measured with respect to a cuvette filled with oil only (i.e., a blank). Each composite set (ribbon and fiber) was placed in a cuvette filled with Cargille Code 5610 ($n_D$=1.490) Laser Liquid, which served as a heat transfer medium as well as a minimizer of reflection loss. Optical transmission measurements were taken at 1° C. intervals as the cuvette was heated at 0.5° C./min.

Figure 5:
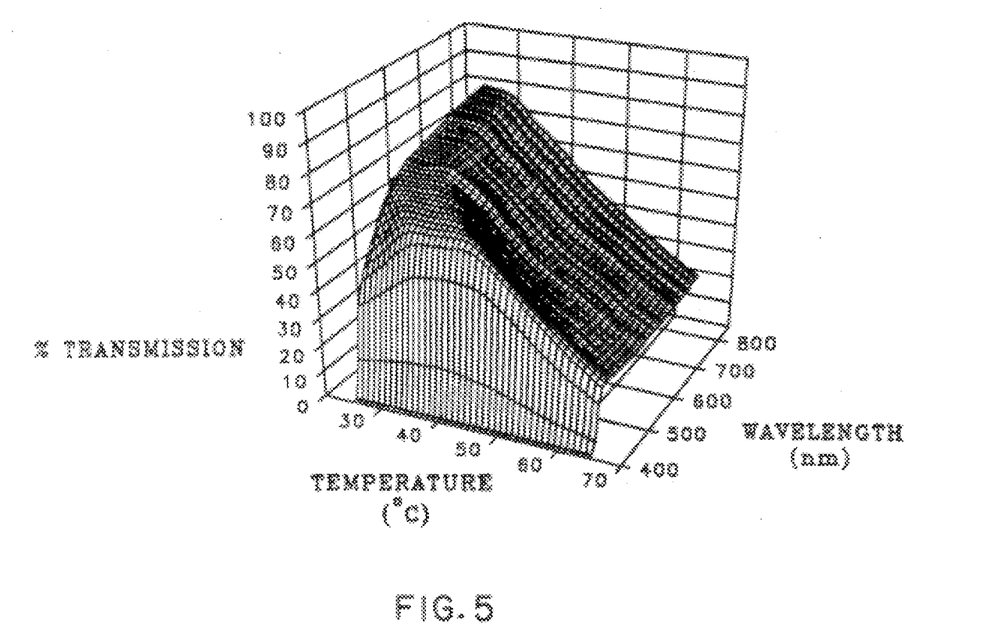
FIG. 5 is a graph which demonstrates the optical transmission of a glass fiber-reinforced PMMA composite (having 24 layers of glass fiber) as a function of temperature and wavelength as measured on an HP8452A Diode Array Spectrophotometer at 1° C. intervals.
Figure 6:
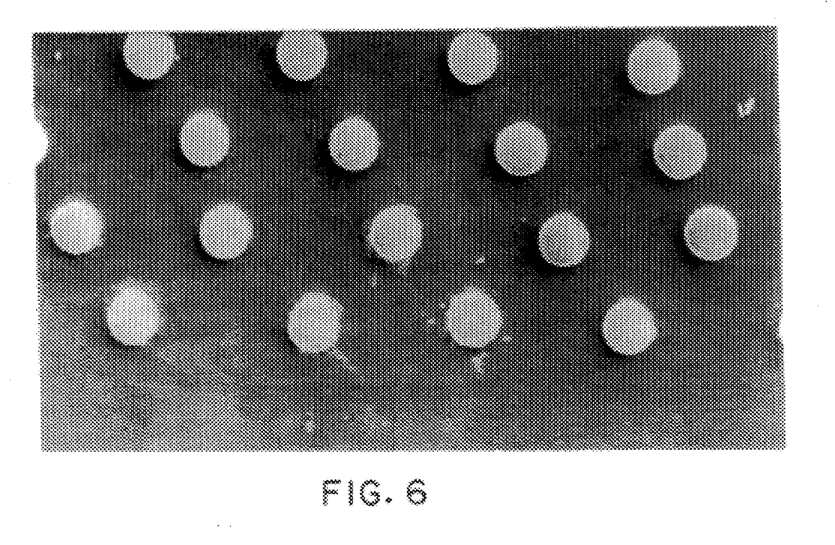
FIG. 6 is a SEM showing a partial cross-section of a glass fiber-reinforced transparent polymer composite wherein the glass fibers are about 73 µm in diameter.

FIG. 5 is a graph of the optical transmission as a function of temperature and wavelength with regard to the a glass-fiber composite (having fibers of about 73 μm at a glass content of about 6.5 vol. %). A SEM of a partial cross-section of this composite is provided by FIG. 6. The maximum optical transmission was attained at slightly above room temperature (the temperature where the refractive index of PMMA most closely matches that of the BK10 glass fiber). As the temperature increased to 65° C., however, the optical transmission decreased by more than 50% due to the increasing mismatch in refractive indices, primarily as a result of the change in the refractive index of the PMMA.

Figure 7:
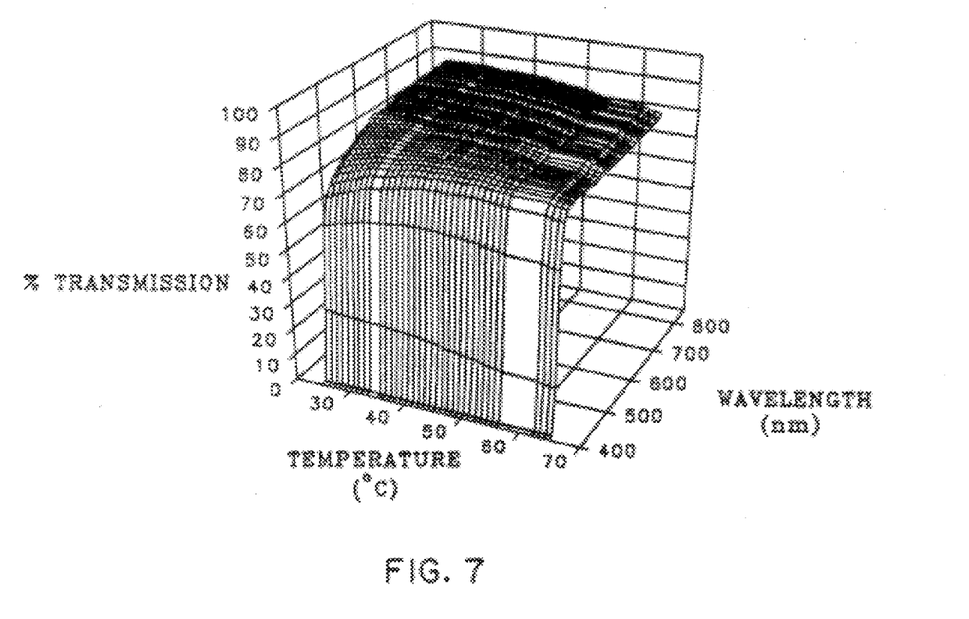
FIG. 7 is a graph which demonstrates the optical transmission of a glass ribbon-reinforced PMMA composite (having 24 layers of glass fiber) as a function of temperature and wavelength as measured on an HP8452A Diode Array Spectrophotometer at 1° C. intervals.
Figure 8:
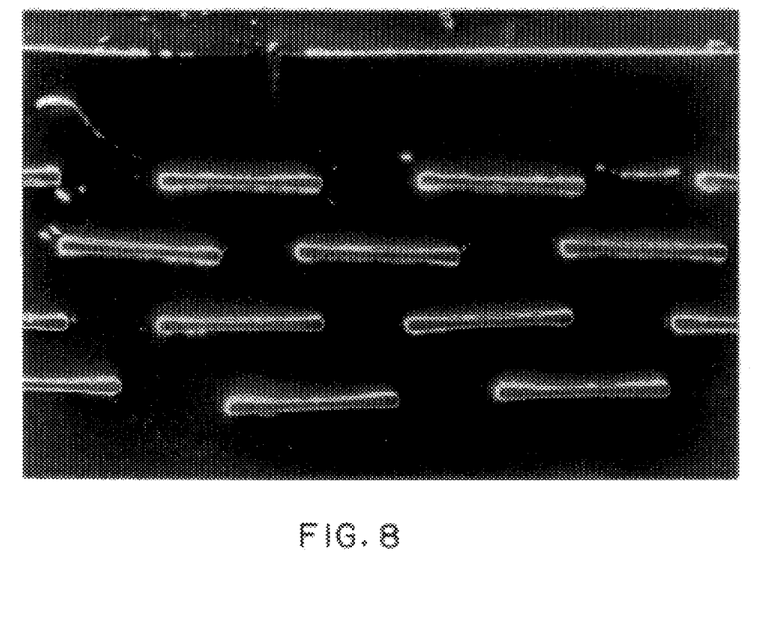
FIG. 8 is a SEM showing a partial cross-section of a glass ribbon-reinforced transparent polymer composite wherein the glass ribbons are about 260 µm in width and about 20 µm in thickness.

FIG. 7 is a graph of the optical transmission as a function of temperature and wavelength with regard to a ribbon composite (260 μm×20 μm, aspect ratio of 13, about 4.6 vol. % glass). A SEM of a partial cross-section of this composite is provided by FIG. 8. As the graph illustrates, the optical transmission of the ribbon composite remains high and substantially constant over the entire visible spectrum in the temperature range of 25°–65° C.

For purposes of the present invention, a composite will have a substantially constant optical transparency when the highest and lowest values of said optical transmission as determined over a given composite temperature range remain within about 15% of one another.

Although optical transmission data is not a direct measure of transparency, the data regarding the ribbon composite indicates significant improvement in optical quality, including clarity, for ribbon composites as compared to fiber composites.

Figure 9:
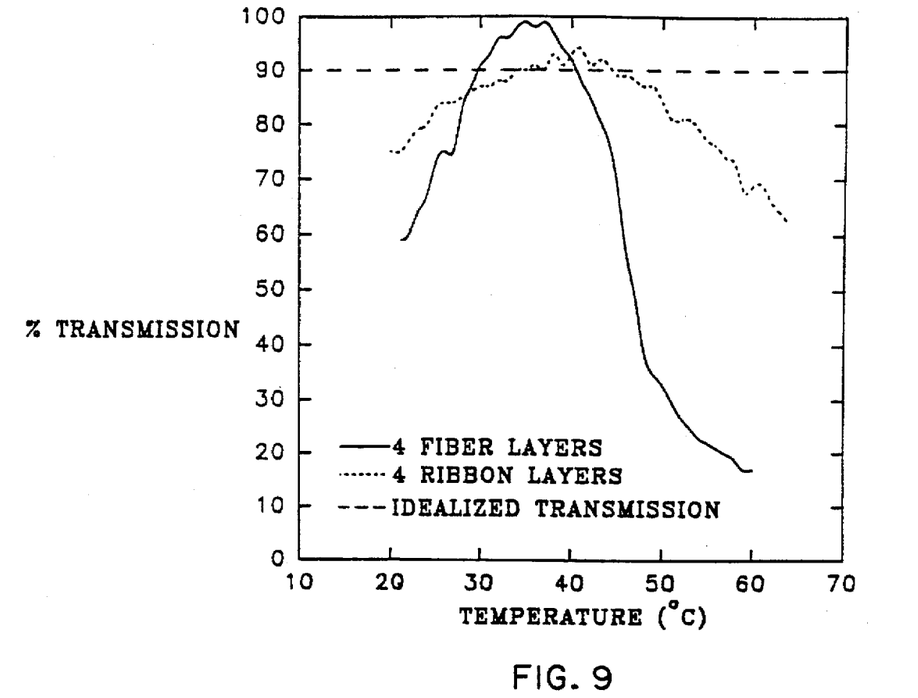
FIG. 9 is a graph which shows the optical transmission of PMMA composites reinforced by four layers of glass fiber (solid line) or glass ribbon (dotted line) as a function of temperature as measured with the composites oriented at 45° to a He/Ne laser beam. The dashed line represents an idealized composite transmission.

The optical transmission of the fiber and ribbon composites oriented at a 45° angle to a beam of light was also measured. The results are set forth in FIG. 9. For this measurement, a helium neon laser was used as the light source and the acceptance angle of the detector was set to approximately 0.15° (i.e., any light scattered at an angle less than 0.15° would be considered as being transmitted). This acceptance angle was small enough so that a composite specimen comprised of four layers of fiber or ribbon prepreg was sufficient to produce measurable transmission losses.

The results showed that, while the composite prepared using fibers possessed a higher maximum transmission, the composite prepared using ribbons retained a much higher transmission over a wider temperature range where a significant refractive index mismatch exists between the glass and polymer.

B. Flexural Strength

The flexural strength of composites made from ribbons and fibers were also compared. Generally, the composites were prepared by laminating multiple layers of fiber or ribbon prepreg to each side of a PMMA plate 6.35 mm thick. Specifically, fiber and ribbon composites containing 4, 8 and 16 layers of prepreg on each side of a pure PMMA core were fabricated, with each composite thus formed having three additional layers of PMMA sheet (about 0.3 mm) laminated to both of its outer surfaces. The fibers and ribbons in these composites were made from a soda-lime glass, rather than from the more expensive BK10 glass. Unreinforced PMMA bars were prepared in the same manner (e.g. temperature and pressure) to that used for the glass-reinforced composites to serve as a control.

The composite and "pure" PMMA samples were cut into rectangular specimens approximately 20 mm wide and 100 mm long. The thicknesses of these specimens ranged from 6 mm to 9 mm, depending upon the number of laminated prepreg layers, but such differences were accounted for in the strength calculations set forth below. The specimens were then tested in three-point bending,on an Instron Model 4204 mechanical test machine, using a span of 80 mm and a crosshead speed of 2 mm/min.

The glass content and relative strength of each specimen is shown in Table 4.

TABLE 4

| SAMPLE DESCRIPTION | AVERAGE GLASS CONTENT (vol. %) | AVERAGE BEAM STRENGTH AS % OF PURE PMMA STRENGTH |
| --- | --- | --- |
| PURE PMMA | 0.00 | 100 |
| 4 LAYERS FIBER | 0.85 | 117 ± 13 |
| 4 LAYERS RIBBON | 1.59 | 113 ± 16 |
| 8 LAYERS FIBER | 1.49 | 120 ± 13 |
| 8 LAYERS RIBBON | 2.38 | 122 ± 14 |
| 16 LAYERS FIBER | 2.29 | 135 ± 13 |
| 16 LAYERS RIBBON | 4.11 | 126 ± 13 |

As shown in Table 4, nearly all the composite samples were stronger than pure PMMA. The fiber and ribbon composite samples show a trend of increasing strength with increasing layers of composite laminate and vol. % glass. Generally, despite the fact the glass content in the composites was relatively low (maximum of 2.3 vol. % fiber and 4.1 vol. % ribbon), the fiber and ribbon composite beams were up to 35% and 26% stronger, respectively, than pure PMMA.

Figure 10:
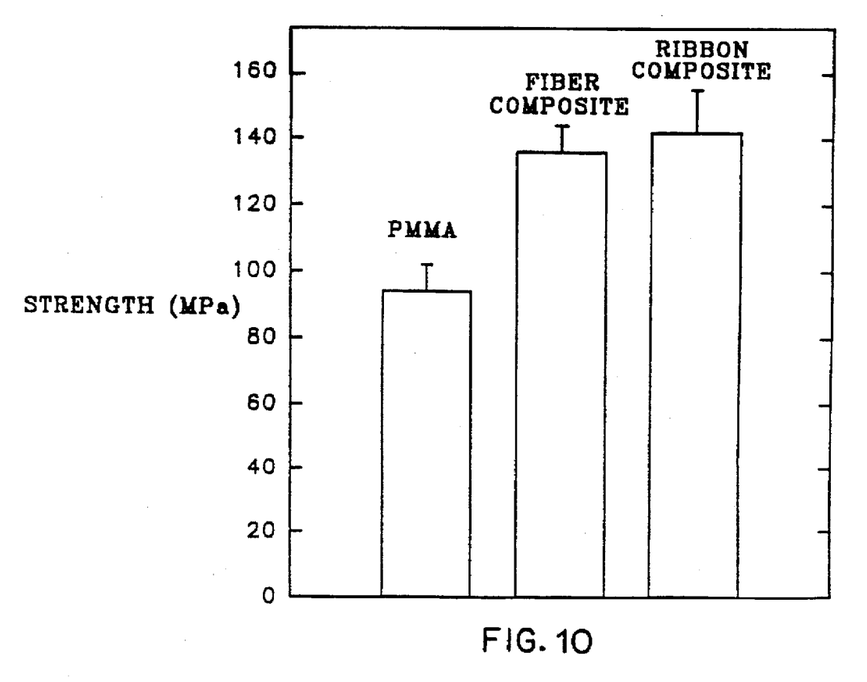
FIG. 10 is a bar graph which shows the average strength of pure (unreinforced) PMMA, glass fiber-reinforced PMMA composites, and glass ribbon-Reinforced PMMA composites.

Moreover, as shown in FIG. 10, increases in strength over pure PMMA were found for the fiber and ribbon composites, respectively. The difference in elastic modulus between the fiber and ribbon laminates is consistent with a higher glass content in the latter.

The foregoing data demonstrates that ribbons provide strength to the composite which is comparable to the strength provided by fibers. Any slight decrease in strength realized with a ribbon over a fiber can be accommodated by protecting the surfaces of ribbons from the adverse effects of moisture and airborne particulate matter during production of the glass ribbon-reinforced composites and by increasing the glass content.

What is claimed is:

1. A polymer composite comprising transparent polymer matrix having at least one planar surface and at least one glass ribbon having a width and a length which define a first planar surface embedded within the matrix, wherein the first planar surface of the at least one ribbon is substantially parallel to the at least one planar surface of the polymer matrix, wherein the polymer matrix and the at least one glass ribbon have refractive indices that are substantially the same.

2. The composite of claim 1, wherein each glass ribbon further includes a second planar surface, the first and second planar surfaces and the at least one planar surface of the polymer matrix being substantially parallel with one another.

3. The composite of claim 2, each glass ribbon further having a thickness defined by the distance between the first and second planar surfaces, wherein the width of each planar surface of each ribbon is equal to or greater than the thickness of each ribbon.

4. The composite of claim 3, wherein the widths of each glass ribbon are equal, and the aspect ratio of each ribbon ranges from about 1 to 50.

5. The composite of claim 4, wherein the width of each glass ribbon ranges from about 50 μm to about 5000 μm and the thickness of each glass ribbon ranges from about 5 μm to about 100 μm.

6. The composite of claim 5, wherein the widths of each glass ribbon are equal, and the aspect ratio of each ribbon ranges from about 10 to 50.

7. The composite of claim 6, wherein said polymeric matrix is selected from the group consisting of polymethylmethacrylate, polycarbonate, a hydrogenated polycyclic norbornene ring-opening polymer made with 5,8-methano-3a,4,4a,5,8a,9,9a-octahydro-1H-benzoindene and 1,4-methano-1,4,4a,4b,5,8,8a,9a-octahydro-9H-fluorene monomer mixture, a copolymer of a styric monomer and a reactive comonomer having a hydroxyl moiety laminated to a polymer having a pendant ester group.

8. The composite of claim 7, wherein the polymeric matrix is polymethylmethacrylate.

9. The composite of claim 1, wherein the at least one glass ribbon is present in the composite in an amount ranging from about 0.1 vol. % to about 50 vol. % of the total composite.

10. The composite of claim 8, wherein the at least one glass ribbon is present in an amount ranging from about 0.1 vol. % to about 20 vol. % of the total composite.

11. A polymer prepreg comprising a transparent polymer matrix having at least one planar surface and at least one glass ribbon bonded to the polymer matrix, the at least one glass ribbon having a width and a length which define a first planar surface, wherein the first planar surface of the at least one ribbon is substantially parallel to the at least one planar surface of the polymer matrix, wherein the polymer matrix and the at least one glass ribbon have refractive indices that are substantially the same.

12. The prepreg of claim 11, each glass ribbon further having a thickness defined by the distance between the first and second planar surfaces, wherein the width of each planar surface of each ribbon is equal to or greater than the thickness of each ribbon.

13. The prepreg of claim 12, wherein the widths of each glass ribbon are equal, and the aspect ratio of each ribbon ranges from about 1 to 50.

14. The prepreg of claim 13, wherein the width of each glass ribbon ranges from about 50 μm to about 5000 μm and the thickness of each glass ribbon ranges from about 5 μm to about 100 μm.

15. The prepreg of claim 14 wherein said polymeric matrix is selected from the group consisting of polymethylmethacrylate, polycarbonate, a hydrogenated polycyclic norbornene ring-opening polymer made with a 5,8-methano-3a,4,4a,5,8a, 9,9a-octahydro-1H-benzoindene and 1,4-methano-1,4,4a,4b,5,8,8a,9a-octahydro-9H-fluorene monomer mixture, a copolymer of a styric monomer and a reactive comonomer having a hydroxyl moiety laminated to a polymer having a pendant ester group.

16. The prepreg of claim 15, wherein the polymeric matrix is polymethylmethacrylate.

17. The prepreg of claim 16, wherein the at least one glass ribbon is present in the composite in an amount ranging from about 5 vol. % to about 90 vol. % of the prepreg.

18. A glass-reinforced polymer composite prepared by contacting a transparent polymer core having at least two sides with at least one prepreg to form a layered structure, heating the layered structure to at least the higher of the glass transition temperature of the prepreg polymer matrix or the glass transition temperature of the transparent polymer core, and applying sufficient pressure to cause the layered structure to laminate, forming a glass-reinforced transparent polymer composite, wherein the prepreg comprises a transparent polymer matrix having at least one planar surface and at least one glass ribbon bonded thereto, the at least one glass ribbon having a width and a length which define a first planar surface, wherein the first planar surface of the at least one ribbon is substantially parallel to the at least one planar surface of the polymer matrix, wherein the polymer matrix and the at least one glass ribbon have refractive indices that are substantially the same.

19. The composite of claim 18, wherein the transparent polymer core and the polymer matrix of the prepreg have the same composition.

20. The composite of claim 19, further comprising contacting at least two prepregs with the transparent polymer core so as to form a layered structure wherein at least one prepreg is on each side of the transparent core.

21. A glass-reinforced transparent polymer composite prepared by layering at least two prepregs upon one another, heating the layered prepregs to at least the glass transition temperature of the polymer matrix, and applying sufficient pressure to cause the layered prepregs to laminate, forming a glass-reinforced transparent polymer composite, wherein each prepreg comprises a transparent polymer matrix having at least one planar surface and at least one glass ribbon bonded thereto, the at least one glass ribbon having a width and length which define a first planar surface, wherein the first planar surface of the at least one ribbon is substantially parallel to the at least one planar surface of the polymer matrix.

22. A polymer composite comprising a transparent polymer matrix having at least one planar surface and at least one glass ribbon having a width and a length which define a first planar surface embedded within the matrix, wherein the first planar surface of the at least one ribbon is substantially parallel to the at least one planar surface of the polymer matrix, wherein the optical transmission of the polymer composite varies by no more than about 15% over a composite temperature range of from 25° C. to 65° C. when the polymer composite is oriented at a 45° angle to a beam of laser light generated by an optical transmission detector having an acceptance angle of 0.15.

23. The polymer composite of claim 22, wherein the optical transmission of the polymer composite as measured over a composite temperature range of from 25° C. to 65° C. is substantially the same.

24. The polymer composite of claim 22, wherein the polymer matrix and the at least one glass ribbon have refractive indices that are substantially the same.

25. A glass-reinforced polymer composite prepared by contacting a transparent polymer core having at least two sides with at least one prepreg to form a layered structure, heating the layered structure to at least the higher of the glass transition temperature of the prepreg polymer matrix or the glass transition temperature of the transparent polymer core, and applying sufficient pressure to cause the layered structure to laminate, forming a glass-reinforced transparent polymer composite, wherein the prepreg comprises a transparent polymer matrix having at least one planar surface and at least one glass ribbon bonded thereto, the at least one glass ribbon having a width and a length which define a first planar surface, wherein the first planar surface of the at least one ribbon is substantially parallel to the at least one planar surface of the polymer matrix, wherein the optical transmission of the polymer composite varies by no more than about 15% over a composite temperature range of from 25° C. to 65° C. when the polymer composite is oriented at a 45° angle to abeam of laser light generated by an optical transmission detector having an acceptance angle of 0.15.

26. The polymer composite of claim 25, wherein the optical transmission of the polymer composite as measured over a composite temperature range of from 25° C. to 65° C. is substantially the same.

27. The polymer composite of claim 26, wherein the polymer matrix and the at least one glass ribbon have refractive indices that are substantially the same.

* * * * *